(12) United States Patent
Li

(10) Patent No.: US 12,541,433 B2
(45) Date of Patent: Feb. 3, 2026

(54) DATA BACKUP METHOD, ELECTRONIC DEVICE, DATA BACKUP SYSTEM, AND CHIP SYSTEM

(71) Applicant: Petal Cloud Technology Co., Ltd., Dongguan (CN)

(72) Inventor: Xuefeng Li, Nanjing (CN)

(73) Assignee: Petal Cloud Technology Co., Ltd.

( * ) Notice: Subject to any disclaimer, the term of this patent is extended or adjusted under 35 U.S.C. 154(b) by 0 days.

(21) Appl. No.: 18/259,863

(22) PCT Filed: Dec. 14, 2021

(86) PCT No.: PCT/CN2021/137946
§ 371 (c)(1),
(2) Date: Jun. 29, 2023

(87) PCT Pub. No.: WO2022/143158
PCT Pub. Date: Jul. 7, 2022

(65) Prior Publication Data
US 2024/0086283 A1    Mar. 14, 2024

(30) Foreign Application Priority Data
Dec. 30, 2020    (CN) .......................... 202011643331.9

(51) Int. Cl.
*G06F 11/14*    (2006.01)
(52) U.S. Cl.
CPC ...... *G06F 11/1451* (2013.01); *G06F 2201/80* (2013.01)
(58) Field of Classification Search
None
See application file for complete search history.

(56) References Cited

U.S. PATENT DOCUMENTS

| | | | |
|---|---|---|---|
| 10,083,094 B1 * | 9/2018 | Thomas | G06F 11/1466 |
| 11,775,186 B1 * | 10/2023 | Setter | G06F 3/0604 |
| | | | 711/100 |
| 2008/0155215 A1 | 6/2008 | Matsuzaki et al. | |
| 2014/0214767 A1 * | 7/2014 | Graefe | G06F 16/27 |
| | | | 707/645 |

(Continued)

FOREIGN PATENT DOCUMENTS

| | | |
|---|---|---|
| CN | 106648979 A | 5/2017 |
| CN | 110597659 A | 12/2019 |
| CN | 111309528 A | 6/2020 |

OTHER PUBLICATIONS

Extended European Search Report in European Appln No. 21913899.7, dated Apr. 26, 2024, 9 pages.

*Primary Examiner* — Kris E Mackes
(74) *Attorney, Agent, or Firm* — Fish & Richardson P.C.

(57) ABSTRACT

The method includes: A first device obtains an auxiliary device of the first device; the first device divides to-be-backed up data into N data sets, where N is a quantity of backup devices, and the backup devices include the first device and the auxiliary device of the first device; the first device sends backup information to the auxiliary device, where the backup information includes a data set allocated to the auxiliary device, and the backup information indicates the auxiliary device to send the received data set to a preset cloud platform; and the first device sends a data set allocated to the first device to the preset cloud platform.

20 Claims, 5 Drawing Sheets

(56) References Cited

U.S. PATENT DOCUMENTS

| | | | |
|---|---|---|---|
| 2016/0088040 A1* | 3/2016 | Threlkeld | G06F 9/452 |
| | | | 709/219 |
| 2016/0320977 A1* | 11/2016 | Shinozaki | G06F 11/1402 |
| 2018/0011643 A1* | 1/2018 | Calder | G06F 11/1458 |
| 2018/0284758 A1* | 10/2018 | Cella | G06N 3/088 |
| 2019/0220366 A1* | 7/2019 | Ke | G06F 11/1451 |
| 2020/0133799 A1* | 4/2020 | Kim | G06F 11/1471 |
| 2020/0401489 A1* | 12/2020 | Mitkar | G06F 11/1469 |
| 2022/0166734 A1* | 5/2022 | Okajima | H04W 4/80 |
| 2023/0267050 A1* | 8/2023 | Liu | G06F 11/1456 |
| | | | 711/162 |

* cited by examiner

DATA BACKUP METHOD, ELECTRONIC DEVICE, DATA BACKUP SYSTEM, AND CHIP SYSTEM

This application is a national stage of International Application No. PCT/CN2021/137946, filed on Dec. 14, 2021, which claims priority to Chinese Patent Application No. 202011643331.9 filed on Dec. 30, 2020. Both of the aforementioned applications are hereby incorporated by reference in their entireties.

TECHNICAL FIELD

This application relates to the cloud backup field, and in particular, to a data backup method, an electronic device, a data backup system, and a chip system.

BACKGROUND

With the development of the mobile Internet era, mobile electronic devices are increasingly valuable to users. Portability of the mobile electronic devices determines that the mobile electronic devices are prone to be lost. If a personal mobile electronic device is lost, data in the mobile electronic device is also lost. Therefore, a cloud backup method is provided to back up data in the personal mobile electronic device on a cloud platform by using cloud storage.

Cloud backup is characterized by a large volume of data to be backed up. To avoid problems such as frame freezing, power consumption, traffic consumption, and network congestion on the electronic device in a backup process, idle time of the electronic device is usually used for backup. For example, the data is backed up when the electronic device is charged, is in a screen-off state, or is connected to Wi-Fi. As a result, it takes a long time periodicity to upload users' personal data to the cloud platform, and data backup efficiency is low.

SUMMARY

Embodiments of this application provide a data backup method, an electronic device, a data backup system, and a chip system, to improve data backup efficiency.

To achieve the foregoing objective, the following technical solutions are used in this application.

According to a first aspect, an embodiment of this application provides a data backup method, including:

A first device obtains an auxiliary device of the first device.

The first device divides to-be-backed up data into N data sets, where N is a quantity of backup devices, and the backup devices include the first device and the auxiliary device of the first device.

The first device sends backup information to the auxiliary device, where the backup information includes a data set allocated to the auxiliary device, and the backup information indicates the auxiliary device to send the received data set to a preset cloud platform.

The first device sends a data set allocated to the first device to the preset cloud platform.

In this embodiment of this application, the first device divides the to-be-backed up data into a plurality of data sets. The plurality of data sets are separately allocated to the first device and the auxiliary device of the first device, and the first device and the auxiliary device of the first device upload respective corresponding data sets to the cloud platform. It is equivalent to dividing an original cloud backup task into a plurality of backup subtasks for a plurality of backup devices (the first device and the auxiliary device of the first device) to perform data backup simultaneously. Therefore, a time periodicity of data backup can be shortened, and data backup efficiency can be improved.

In a possible implementation of the first aspect, that the first device obtains the auxiliary device of the first device includes:

The first device obtains a candidate auxiliary device having a capability of communicating with the first device.

The first device uses the candidate auxiliary device that meets a first preset condition as the auxiliary device of the first device.

In a possible implementation of the first aspect, that the first device obtains the candidate auxiliary device having the capability of communicating with the first device includes:

The first device broadcasts first information via Bluetooth, where the first information indicates a second device that receives the first information to feed back device information of a second device.

The first device uses the second device indicated by the received device information as the candidate auxiliary device of the first device.

In a possible implementation of the first aspect, that the first device obtains the candidate auxiliary device having the capability of communicating with the first device includes:

The first device transmits communication information of the first device to a third device by using an NFC module, where the communication information indicates the third device to establish a communication connection to the first device by using the communication information of the first device.

The first device uses the third device that successfully establishes the communication connection to the first device as the candidate auxiliary device of the first device.

Alternatively, the first device obtains communication information of a third device by using an NFC module, and the first device establishes a communication connection to the third device by using the communication information of the third device.

The first device uses the third device that successfully establishes the communication connection to the first device as the candidate auxiliary device of the first device.

In a possible implementation of the first aspect, that the first device obtains the candidate auxiliary device having the capability of communicating with the first device includes:

Code system information that carries the communication information of the first device is set in the first device, where the code system information indicates a fourth device that scans the code system information to establish a communication connection to the first device by using the communication information of the first device that is obtained through scanning.

The first device uses the fourth device that successfully establishes the communication connection to the first device as the candidate auxiliary device of the first device.

Alternatively, the first device scans code system information including communication information of a fourth device, to obtain the communication information of the fourth device.

The first device establishes a communication connection to the fourth device by using the communication information of the fourth device.

The first device uses the fourth device that successfully establishes the communication connection to the first device as the candidate auxiliary device of the first device.

In a possible implementation of the first aspect, that the first device uses the candidate auxiliary device that meets the first preset condition as the auxiliary device of the first device includes:

The first device uses the candidate auxiliary device whose average charging time is greater than a first preset time, whose average load of a central processing unit is less than a first preset proportion, whose average uplink bandwidth is greater than a first preset value, and whose current remaining storage space is greater than a second preset value as the auxiliary device of the first device.

In a possible implementation of the first aspect, that the first device uses the candidate auxiliary device that meets the first preset condition as the auxiliary device of the first device includes:

The first device obtains a score and a weight that correspond to each piece of device information of the candidate auxiliary device, where the device information of the candidate auxiliary device includes one or more of the following: an average charging time, an average load of a central processing unit, an average uplink bandwidth, and a current remaining storage space.

The first device calculates a weighted sum of the device information of the first device based on the score and the weight that correspond to each piece of the device information of the candidate auxiliary device.

The first device uses the candidate auxiliary device whose weighted sum of the device information is greater than a third preset value as the auxiliary device of the first device.

In a possible implementation of the first aspect, that the first device uses the candidate auxiliary device that meets the first preset condition as the auxiliary device of the first device includes:

The first device obtains a historical backup parameter of the candidate auxiliary device and historical device information corresponding to the historical backup parameter, where the historical backup parameter includes a historical backup speed and historical backup duration, and the historical device information includes one or more of the following: an average charging time, an average load of a central processing unit, an average uplink bandwidth, and a remaining storage space corresponding to the historical backup parameter.

The first device trains a preset backup model based on the historical backup parameter and the historical device information corresponding to the historical backup parameter, to obtain a trained backup model.

The first device inputs the device information of the candidate auxiliary device into the trained backup model, to obtain predicted backup parameters of the candidate auxiliary device, where the predicted backup parameters include a predicted backup speed and predicted backup duration.

The first device generates a score of the candidate auxiliary device based on the predicted backup parameters, and uses the candidate auxiliary device whose score is greater than a fourth preset value as the auxiliary device of the first device.

In a possible implementation of the first aspect, that the first device divides the to-be-backed up data into N data sets includes:

The first device obtains predicted backup parameters of the backup devices, where the predicted backup parameters include a predicted backup speed and predicted backup duration.

The first device obtains, based on the predicted backup parameters of the backup devices and a total data volume of the to-be-backed up data, a data volume allocated to each backup device.

The first device divides, based on the data volume allocated to each backup device, the to-be-backed up data into a data set that matches the data volume of each backup device.

In a possible implementation of the first aspect, that the first device divides, based on the data volume allocated to each backup device, the to-be-backed up data into the data set that matches the data volume of each backup device includes:

The first device scans a storage space in which the to-be-backed up data is located, to obtain a tree structure directory of the to-be-backed up data, where tree structure directory information of the to-be-backed up data includes: a root node of the to-be-backed up data, a data volume of the root node, a child node, a data volume of the child node, a leaf node, and a data volume of the leaf node.

The first device obtains a leaf node allocated to each backup device based on the tree structure directory of the to-be-backed up data and the data volume allocated to each backup device, where a set formed by data represented by the leaf node allocated to each backup device is the data set of each backup device.

In a possible implementation of the first aspect, the method further includes:

The first device obtains backup progress information of the auxiliary device in a preset time periodicity.

When a backup exception exists in the backup progress information of the auxiliary device, the first device reallocates, to the first device and/or an auxiliary device of normal backup, data that fails to be backed up and that is in the data set allocated to the auxiliary device with the backup exception.

In a possible implementation of the first aspect, that the first device obtains the auxiliary device of the first device includes:

The first device broadcasts second information, where the second information carries an identifier of subdata in the to-be-backed up data, the second information indicates a fifth device that receives the second information to select, based on device information of the fifth device and information about the to-be-backed up data, subdata in the to-be-backed up data, and send an identifier of the selected subdata to the first device.

The first device uses the fifth device corresponding to the identifier of the received subdata as the auxiliary device of the first device.

In a possible implementation of the first aspect, that the first device divides the to-be-backed up data into N data sets includes:

The first device divides, based on an identifier of subdata sent by the auxiliary device and a data volume of the subdata, the to-be-backed up data into a data set that matches each backup device.

According to a second aspect, an embodiment of this application provides an electronic device, including:
- an auxiliary device obtaining module, configured to obtain an auxiliary device of a first device;
- a data division module, configured to divide to-be-backed up data into N data sets, where N is a quantity of backup devices, and the backup devices include the first device and the auxiliary device of the first device;
- a backup information sending module, configured to send backup information to the auxiliary device, where the backup information includes a data set allocated to the auxiliary device, and the backup information indicates the auxiliary device to send the received data set to a preset cloud platform; and a backup module, configured to send a data set allocated to the first device to the preset cloud platform.

According to a third aspect, an electronic device is provided, including a processor, where the processor is configured to run a computer program stored in a memory, to implement the method according to any implementation of the first aspect of this application.

According to a fourth aspect, a data backup system is provided. The data backup system includes the electronic device provided in the third aspect of this application and at least one auxiliary device.

The auxiliary device is configured to: after receiving a data set allocated to the auxiliary device, store the data set in a storage space of the auxiliary device, and when the auxiliary device meets a second preset condition, send the data set stored in the storage space of the auxiliary device to a preset cloud platform.

According to a fifth aspect, a chip system is provided. The chip system includes a processor, where the processor is coupled to a memory, and the processor executes a computer program stored in the memory, to implement the method according to any implementation of the first aspect of this application.

According to a sixth aspect, a computer-readable storage medium is provided, where the computer-readable storage medium stores a computer program. When the computer program is executed by one or more processors, the method according to any implementation of the first aspect of this application is implemented.

According to a seventh aspect, an embodiment of this application provides a computer program product. When the computer program product runs on a device, the device is enabled to perform the method according to any implementation of the first aspect.

It may be understood that, for beneficial effects of the second aspect to the seventh aspect, refer to related descriptions in the first aspect. Details are not described herein again.

DESCRIPTION OF EMBODIMENTS

In the following descriptions, for illustration instead of limitation, specific details such as a particular system structure and a technology are provided to make a thorough understanding of embodiments of this application. However, a person skilled in the art should know that this application may be implemented in other embodiments without these specific details.

It should be understood that, when used in the specification and the appended claims of this application, the term "include" indicates presence of described features, entireties, steps, operations, elements, and/or components, but does not exclude presence or addition of one or more other features, entireties, steps, operations, elements, components, and/or sets thereof.

It should be further understood that in embodiments of this application, "one or more" means one, two, or more, and the term "and/or" is an association relationship for describing associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

In addition, in the descriptions of the specification and claims of this application, the terms "first", "second", "third", and the like are merely used for differentiated description, but shall not be understood as an indication or an implication of relative importance.

Reference to "an embodiment", "some embodiments", or the like described in the specification of this application indicates that one or more embodiments of this application include a specific feature, structure, or characteristic described with reference to the embodiments. Therefore, statements such as "in one embodiment", "in some embodiments", "in some other embodiments", and "in still some other embodiments" that appear at different places in this specification do not necessarily refer to a same embodiment, but mean "one or more but not all embodiments", unless otherwise specially emphasized in another manner. The terms "include", "comprise", "have", and their variants all mean "include but are not limited to", unless otherwise specifically emphasized in another manner.

Figure 1:
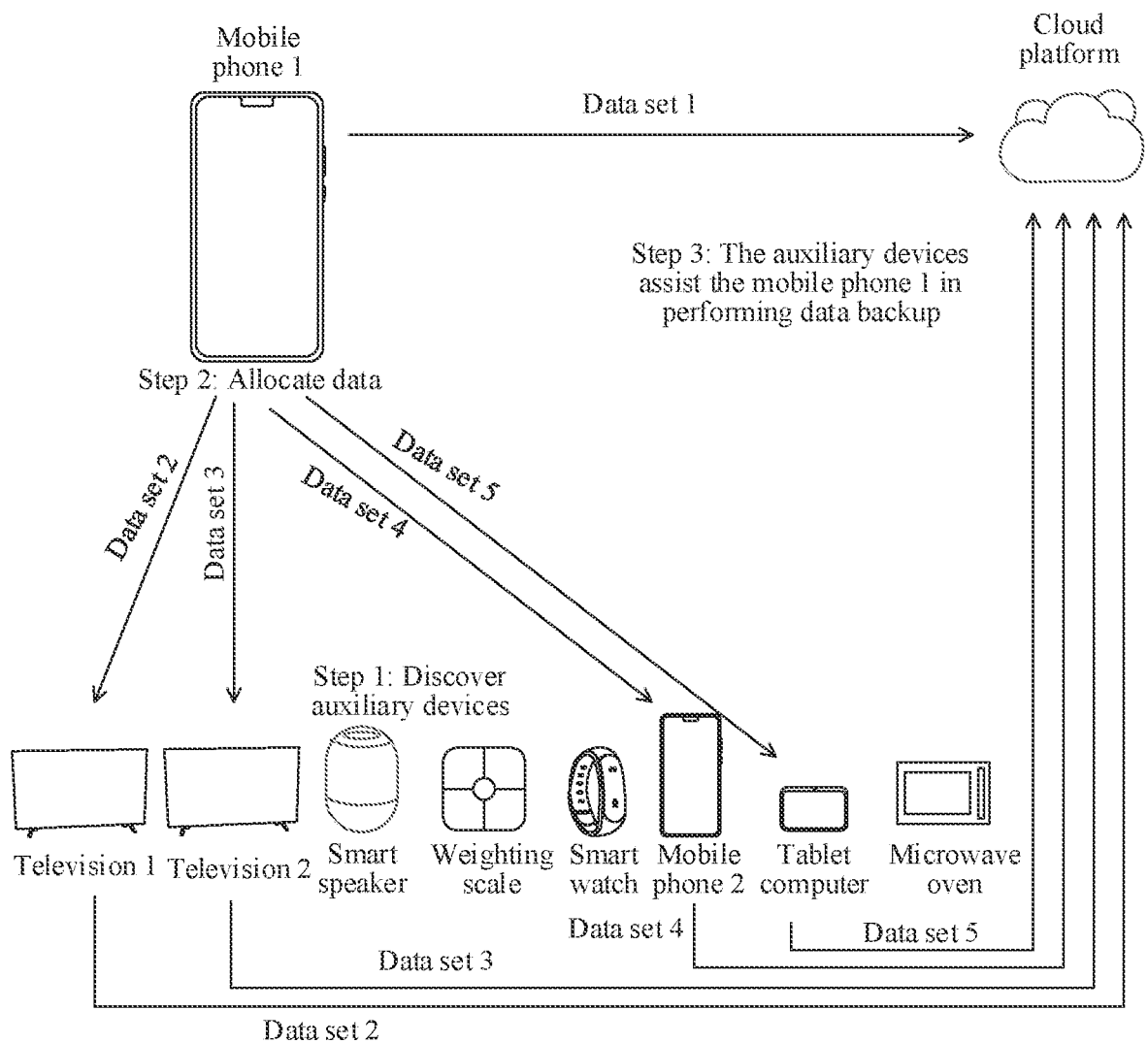
FIG. 1 is a schematic diagram of an application scenario of a data backup method according to an embodiment of this application.

A data backup method provided in this embodiment of this application may be applied to an application scenario shown in FIG. 1. As shown in FIG. 1, data in a mobile phone 1 needs to be backed up to a cloud platform (cloud backup for short). The cloud backup is to avoid data loss in the mobile phone 1 caused by a fault or loss of the mobile phone 1. Therefore, when the cloud backup is performed, to-be-backed up data is usually entire data of the mobile phone 1, for example, a photo, a recording, data related to an application program, and another file stored in the mobile phone 1.

Certainly, in actual application, a user may alternatively select to-be-backed up data independently. Regardless of which manner is adopted, a volume of to-be-backed up data is usually large, and a cloud backup process occupies an uplink bandwidth, occupies system memory, and further increases power consumption. Therefore, the cloud backup process is usually performed when the mobile phone 1 is in a charging state, is in a screen-off state, or is connected to a wireless local area network (Wireless Fidelity, Wi-Fi). As a result, cloud backup takes a long time period, and cloud backup efficiency is low.

In this embodiment of this application, a cloud backup task of the mobile phone 1 may be divided to another device for performing.

As shown in step 1 in FIG. 1, the mobile phone 1 discovers an auxiliary device of the mobile phone 1. For example, the mobile phone 1 in a home environment discovers other electronic devices around the mobile phone 1 via Bluetooth. As shown in FIG. 1, the mobile phone 1 discovers a television 1, a television 2, a smart speaker, a weighting scale, a smart watch, an idle mobile phone 2, a tablet computer, a microwave oven, and the like around. The mobile phone 1 may select some of the discovered electronic devices as auxiliary devices of the mobile phone 1. For example, the television 1, the television 2, the idle mobile phone 2, and the tablet computer may be selected as the auxiliary devices of the mobile phone 1, that is, a quantity of auxiliary devices of the mobile phone 1 is four.

As shown in step 2 in FIG. 1, the mobile phone 1 divides to-be-backed up data into five data sets, and sends four of the data sets to the auxiliary devices respectively. Because the mobile phone 1 may also perform a data backup process, it is equivalent that there are five backup devices for performing data backup: the mobile phone 1 and four auxiliary devices of the mobile phone 1. The mobile phone 1 divides the to-be-backed up data into five data sets, and the five data sets are allocated to the mobile phone 1 and the auxiliary devices of the mobile phone 1 as five backup subtasks. The mobile phone 1 sends four of the data sets to four auxiliary devices respectively. In actual application, the mobile phone 1 may transmit, to the auxiliary devices of the mobile phone 1, the data sets corresponding to the backup subtasks in some high-speed transmission manners. For example, a manner of 5G Wi-Fi, Wi-Fi Direct, or the like may be used. Because a transmission rate of the high-speed transmission manner is relatively high, a data offload process indicated in step 2 is relatively fast.

As shown in step 3 in FIG. 1, a backup subtask corresponding to the mobile phone 1 is a backup data set 1, and backup subtasks respectively corresponding to the four auxiliary devices of the mobile phone 1 are a backup data set 2 to a data set 5. The mobile phone 1 selects an idle time (for example, a time in which the mobile phone 1 is in a charging state, is in a screen-off state, or is connected to a wireless local area network) to upload the data set 1 to the cloud platform. Similarly, the auxiliary devices of the mobile phone 1 separately select an idle time to upload corresponding data sets to the cloud platform.

It can be understood from the application scenario shown in FIG. 1, in a case in which it takes a time T for the mobile phone 1 to independently perform the cloud backup task, if the data backup method provided in the application scenario shown in FIG. 1 is used, it takes a time of about 0.2 T for the mobile phone 1 and the auxiliary devices of the mobile phone 1 to simultaneously perform the cloud backup task. This greatly improves data backup efficiency.

In addition, it should be noted that the application scenario shown in FIG. 1 is a scenario of a user's home environment, and the auxiliary devices of the mobile phone 1 are all the user's devices. In actual application, when the mobile phone 1 is in a public place, an auxiliary device of the mobile phone 1 may alternatively be a public device in the public place. Home of an auxiliary device of the mobile phone 1 is not limited in this embodiment of this application.

The data backup method provided in the application scenario shown in FIG. 1 may be applied to the electronic devices provided in the application scenario shown in FIG. 1. In actual application, an electronic device that performs the data backup method may be an electronic device that needs to perform data backup, such as a mobile phone, a tablet computer, a wearable device, a vehicle-mounted device, a smart speaker, a smart screen, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in this embodiment of this application.

Figure 2:
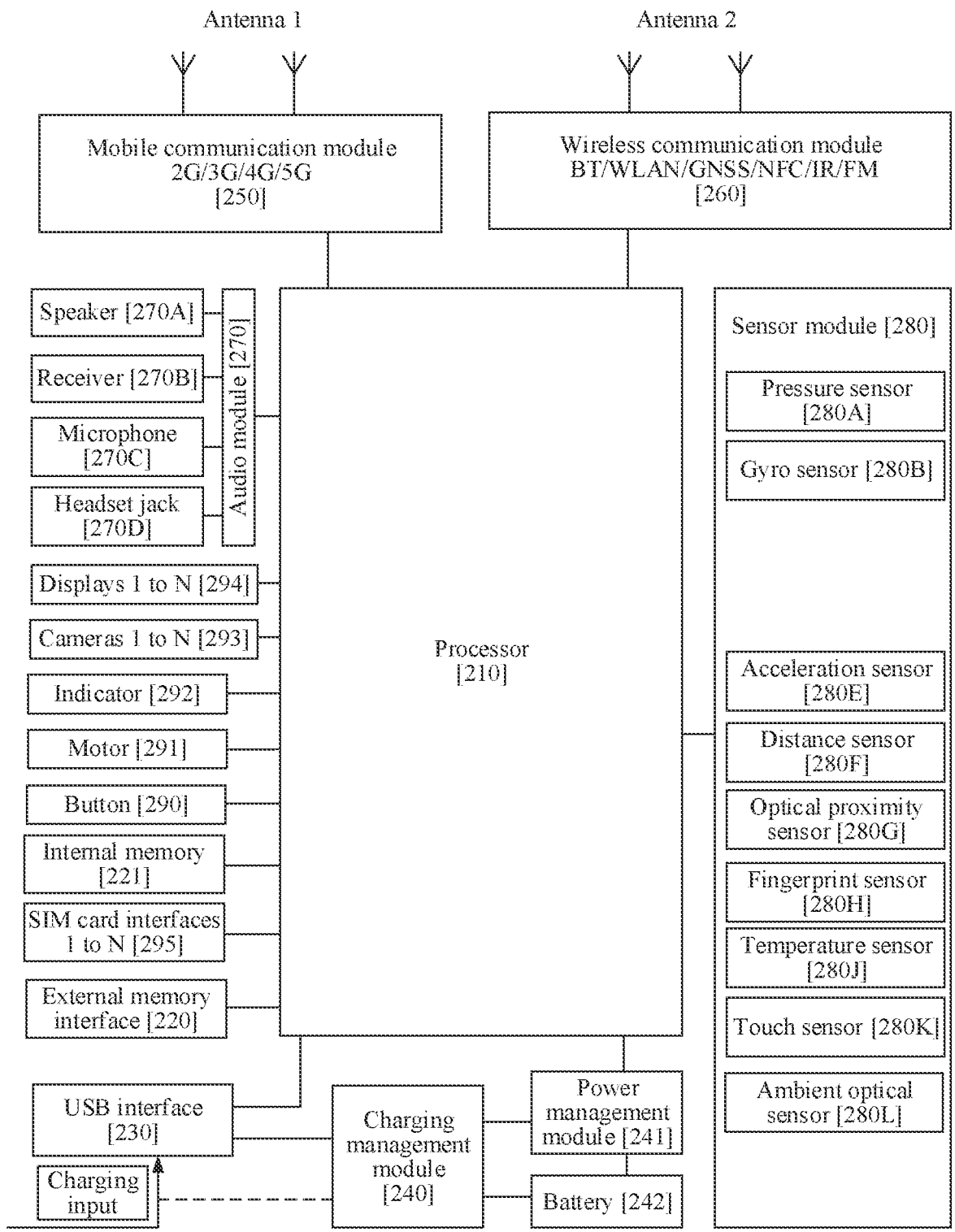
FIG. 2 is a schematic diagram of a hardware structure of an electronic device for performing a data backup method according to an embodiment of this application.

FIG. 2 is a schematic diagram of an electronic device according to an embodiment of this application. An electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (subscriber identification module, SIM) card interface 295, and the like. The sensor module 280 may include a pressure sensor 280A, a gyro sensor 280B, an acceleration sensor 280E, a distance sensor 280F, an optical proximity sensor 280G, a fingerprint sensor 280H, a temperature sensor 280J, a touch sensor 280K, an ambient optical sensor 280L, and the like.

It may be understood that the structure shown in this embodiment of this application does not constitute a specific limitation on the electronic device 200. In some other embodiments of this application, the electronic device 200 may include more or fewer components than those shown in the figure, or combine some components, or split some components, or use a different component layout. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. For example, the processor 210 is configured to perform the data backup method in this embodiment of this application, for example, step 301 to step 304.

The controller may be a nerve center and a command center of the electronic device 200. The controller may generate an operation control signal based on instruction operation code and a time sequence signal, to complete control of instruction reading and instruction execution.

The memory may be further disposed in the processor 210, and is configured to store instructions and data. In some embodiments, the memory in the processor 210 is a cache. The memory may store instructions or data that has been used or cyclically used by the processor 210. If the processor 210 needs to use the instructions or the data again, the processor 210 may directly invoke the instructions or the data from the memory.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The USB interface 230 is an interface that conforms to a USB standard specification, and may be specifically a mini USB interface, a micro USB interface, a USB type-C interface, or the like. The USB interface 230 may be configured to connect to a charger to charge the electronic device 200, or may be configured to transmit data between the electronic device 200 and a peripheral device, or may be configured to connect to a headset for playing audio through the headset. The interface may be further configured to connect to another electronic device such as an AR device.

It may be understood that an interface connection relationship between the modules shown in this embodiment of this application is merely an example for description, and does not constitute a limitation on the structure of the electronic device 200. In some other embodiments of this application, the electronic device 200 may alternatively use an interface connection manner different from that in the foregoing embodiment, or use a combination of a plurality of interface connection manners.

The charging management module 240 is configured to receive a charging input from a charger. The charger may be a wireless charger or a wired charger. In some embodiments of wired charging, the charging management module 240 may receive a charging input of the wired charger through the USB interface 230. In some embodiments of wireless charging, the charging management module 240 may receive a wireless charging input through a wireless charging coil of the electronic device 200. When charging the battery 242, the charging management module 240 may further supply power to the electronic device by using the power management module 241.

The power management module 241 is configured to connect to the battery 242, the charging management module 240, and the processor 210. The power management module 241 receives an input of the battery 242 and/or the charging management module 240, to supply power to the processor 210, the internal memory 221, an external memory, the display 294, the camera 293, the wireless communication module 260, and the like. The power management module 241 may be further configured to monitor parameters such as a battery capacity, a battery cycle count, and a battery health state (electric leakage or impedance). In some other embodiments, the power management module 241 may alternatively be disposed in the processor 210. In some other embodiments, the power management module 241 and the charging management module 240 may alternatively be disposed in a same component.

A wireless communication function of the electronic device 200 may be implemented by using the antenna 1, the antenna 2, the mobile communication module 250, the wireless communication module 260, the modem processor, the baseband processor, and the like.

The antenna 1 and the antenna 2 are configured to transmit and receive an electromagnetic wave signal. Each antenna in the electronic device 200 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 250 may provide a wireless communication solution that is applied to the electronic device 200 and that includes 2G/3G/4G/5G or the like. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering or amplification on the received electromagnetic wave, and transmit the electromagnetic wave to the modem processor for demodulation. The mobile communication module 250 may further amplify a signal modulated by the modem processor, and convert the signal into an electromagnetic wave for radiation through the antenna 1.

In some embodiments, at least some functional modules in the mobile communication module 250 may be disposed in the processor 210. In some embodiments, at least some functional modules in the mobile communication module 250 may be disposed in a same component as at least some modules in the processor 210.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 270A, the receiver 270B, or the like), or displays an image or a video by using the display 294. In some embodiments, the modem processor may be an independent component. In some other embodiments, the modem processor may be independent of the processor 210, and is disposed in a same component as the mobile communication module 250 or another functional module.

The wireless communication module 260 may provide a wireless communication solution that is applied to the electronic device 200 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 260 may be one or more components integrating at least one communication processing module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

In some embodiments, in the electronic device 200, the antenna 1 and the mobile communication module 250 are coupled, and the antenna 2 and the wireless communication module 260 are coupled, so that the electronic device 200 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system. SBAS).

The electronic device 200 implements a display function by using the GPU, the display 294, the application processor, and the like. The GPU is a microprocessor for image processing, and is connected to the display 294 and the application processor. The GPU is configured to perform mathematical and geometric computation, and render an image. The processor 210 may include one or more GPUs that execute program instructions to generate or change display information.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 200 may include one or N displays 294, where N is a positive integer greater than 1.

The electronic device 200 may implement a photographing function by using the ISP, the camera 293, the video codec, the GPU, the display 294, the application processor, and the like.

The ISP is configured to process data fed back by the camera 293. For example, during photographing, a shutter is pressed, light is transferred to a camera photosensitive element through a lens, an optical signal is converted into an electrical signal, and the camera photosensitive element transfers the electrical signal to the ISP for processing, to convert the electrical signal into a visible image. The ISP may further optimize an algorithm for noise, brightness, and complexion of the image. The ISP may further optimize parameters such as exposure and a color temperature of a photographing scene. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (charge coupled device. CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 200 may include one or N cameras 293, where N is a positive integer greater than 1.

The digital signal processor is configured to process a digital signal, and may process another digital signal in addition to the digital image signal. For example, when the electronic device 200 selects a frequency, the digital signal processor is configured to perform Fourier transform and the like on frequency energy.

The video codec is configured to compress or decompress a digital video. The electronic device 200 may support one or more video codecs. Therefore, the electronic device 200 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device 200 may be implemented by using the NPU.

The external memory interface 220 may be configured to connect to an external storage card, for example, a Micro SD card, to extend a storage capability of the electronic device 200. The external storage card communicates with the processor 210 through the external memory interface 220, to implement a data storage function. For example, files such as music and videos are stored in the external storage card.

The internal memory 221 may be configured to store computer-executable program code, and the executable program code includes instructions. The processor 210 executes various function applications and data processing of the electronic device 200 by running the instructions stored in the internal memory 221. The internal memory 221 may include a program storage area and a data storage area.

In addition, the internal memory 221 may include a high-speed random access memory, and may further include a nonvolatile memory, for example, at least one magnetic disk storage device, a flash memory, or a universal flash storage (universal flash storage, UFS).

The electronic device 200 may implement an audio function such as music playing or recording by using the audio module 270, the speaker 270A, the receiver 270B, the microphone 270C, the headset jack 270D, the application processor, and the like.

The audio module 270 is configured to convert a digital audio signal into an analog audio signal for output, and is also configured to convert an analog audio input into a digital audio signal. The audio module 270 may be further configured to code and decode an audio signal. In some embodiments, the audio module 270 may be disposed in the processor 210, or some functional modules of the audio module 270 are disposed in the processor 210.

The speaker 270A, also referred to as a "loudspeaker", is configured to convert an audio electrical signal into a sound signal. The electronic device 200 may listen to music or answer a call in a hand-free mode by using the speaker 270A.

The receiver 270B, also referred to as an "earpiece", is configured to convert an audio electrical signal into a sound signal. When a call is answered or voice information is received by using the electronic device 200, the receiver 270B may be put close to a human ear to listen to a voice.

The microphone 270C, also referred to as a "mike" or a "mic", is configured to convert a sound signal into an electrical signal. When making a call or sending voice information, a user may make a sound near the microphone 270C through the mouth of the user, to input the sound signal to the microphone 270C. At least one microphone 270C may be disposed in the electronic device 200. In some other embodiments, two microphones 270C may be disposed in the electronic device 200, to collect a sound signal and further implement a noise reduction function. In some other embodiments, three, four, or more microphones 270C may alternatively be disposed in the electronic device 200, to collect a sound signal, reduce noise, identify a sound source, implement a directional recording function, and the like.

The headset jack 270D is configured to connect to a wired headset. The headset jack 270D may be the USB interface 230, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 280A is configured to sense a pressure signal, and may convert the pressure signal into an electrical signal. In some embodiments, the pressure sensor 280A may be disposed on the display 294. There are a plurality of types of pressure sensors 280A, such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 280A. The electronic device 200 determines pressure intensity based on the change of the capacitance. When a touch operation is performed on the display 294, the electronic device 200 detects intensity of the touch operation by using the pressure sensor 280A. The electronic device 200 may also calculate a touch location based on a detection signal of the pressure sensor 280A.

The gyro sensor 280B may be configured to determine a motion posture of the electronic device 200. In some embodiments, an angular velocity of the electronic device 200 around three axes (namely, x, y, and z axes) may be determined by using the gyro sensor 280B. The gyro sensor 280B may be configured to implement image stabilization during photographing. For example, when the shutter is pressed, the gyro sensor 280B detects an angle at which the electronic device 200 jitters, obtains, through calculation based on the angle, a distance for which a lens module needs to compensate, and allows the lens to cancel the jitter of the electronic device 200 through reverse motion, to implement image stabilization. The gyro sensor 280B may also be used in a navigation scenario and a somatic game scenario.

The acceleration sensor 280E may detect magnitude of accelerations in various directions (usually on three axes) of the electronic device 200, and may detect magnitude and a direction of gravity when the electronic device 200 is still. The acceleration sensor 280E may be further configured to identify a posture of the electronic device, and is used in an application such as switching between a landscape mode and a portrait mode or a pedometer.

The distance sensor 280F is configured to measure a distance. The electronic device 200 may measure the distance through infrared or laser. In some embodiments, in a photographing scenario, the electronic device 200 may measure a distance by using the distance sensor 280F, to implement quick focusing.

The optical proximity sensor 280G may include, for example, a light emitting diode (LED) and an optical detector such as a photodiode. The light emitting diode may be an infrared light emitting diode. The electronic device 200 emits infrared light by using the light emitting diode. The electronic device 200 detects infrared reflected light from a nearby object by using the photodiode. When sufficient reflected light is detected, it may be determined that there is an object near the electronic device 200. When insufficient reflected light is detected, the electronic device 200 may determine that there is no object near the electronic device 200. The electronic device 200 may detect, by using the optical proximity sensor 280G, that a user holds the electronic device 200 close to an ear to make a call, to automatically turn off a screen for power saving. The optical proximity sensor 280G may also be used for automatic screen unlocking and locking in a smart cover mode or a pocket mode.

The ambient light sensor 280L is configured to sense ambient light luminance. The electronic device 200 may adaptively adjust luminance of the display 294 based on the sensed ambient light luminance. The ambient light sensor 280L may also be configured to automatically adjust white balance during photographing. The ambient light sensor 280L may also cooperate with the optical proximity sensor 280G to detect whether the electronic device 200 is in a pocket to prevent an accidental touch.

The fingerprint sensor 280H is configured to collect a fingerprint. The electronic device 200 may use a feature of the collected fingerprint to implement fingerprint-based unlocking, application lock access, fingerprint-based photographing, fingerprint-based call answering, and the like.

The temperature sensor 280J is configured to detect a temperature. In some embodiments, the electronic device 200 executes a temperature processing policy by using the temperature detected by the temperature sensor 280J. For example, when the temperature reported by the temperature sensor 280J exceeds a threshold, the electronic device 200 lowers performance of a processor located near the temperature sensor 280J, to reduce power consumption and implement thermal protection. In some other embodiments, when the temperature is less than another threshold, the electronic device 200 heats the battery 242, to prevent the electronic device 200 from being shut down abnormally due to a low temperature. In some other embodiments, when the temperature is less than still another threshold, the electronic device 200 boosts an output voltage of the battery 242, to avoid an abnormal shutdown caused by a low temperature.

The touch sensor 280K is also referred to as a "touch panel". The touch sensor 280K may be disposed on the display 294, and the touch sensor 280K and the display 294 form a touchscreen, which is also referred to as a "touch control screen". The touch sensor 280K is configured to detect a touch operation performed on or near the touch sensor 280K. The touch sensor may transfer a detected touch operation to the application processor, to determine a type of a touch event. Visual output related to the touch operation may be provided by using the display 294. In some other embodiments, the touch sensor 280K may alternatively be disposed on a surface of the electronic device 200, or disposed in a position different from the display 294.

The button 290 includes a power button, a volume button, and the like. The button 290 may be a mechanical button, or may be a touch button. The electronic device 200 may receive a button input, and generate a button signal input related to a user setting and function control of the electronic device 200.

The motor 291 may generate a vibration prompt. The motor 291 may be configured to provide an incoming call vibration prompt or a touch vibration feedback. For example, touch operations performed on different applications (for example, photographing or audio playing) may correspond to different vibration feedback effects. The motor 291 may also generate different vibration feedback effects for touch operations performed on different areas of the display 294. Different application scenarios (for example, a time reminder, receiving information, an alarm clock, and a game) may also correspond to different vibration feedback effects. A touch vibration feedback effect may be further customized.

The indicator 292 may be an indicator light, and may be configured to indicate a charging status and a power change, or may be configured to indicate a message, a missed call, a notification, and the like.

The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may also be compatible with different types of SIM cards. The SIM card interface 295 may also be compatible with the external storage card. The electronic device 200 interacts with a network by using the SIM card, to implement functions such as calling and data communication. In some embodiments, the electronic device 200 uses an eSIM, that is, an embedded SIM card. The eSIM card may be embedded into the electronic device 200, and cannot be separated from the electronic device 200.

A specific structure of an execution body of the data backup method is not particularly limited in embodiments of this application, provided that a program that records the data backup method in embodiments of this application can be run to perform communication according to the data backup method provided in embodiments of this application. For example, the data backup method provided in embodiments of this application may be performed by a functional module that is in the electronic device and that can invoke and execute a program, or an apparatus, for example, a chip used in the electronic device. The following embodiment is described by using an example in which the data backup method is performed by a first device.

Figure 3:
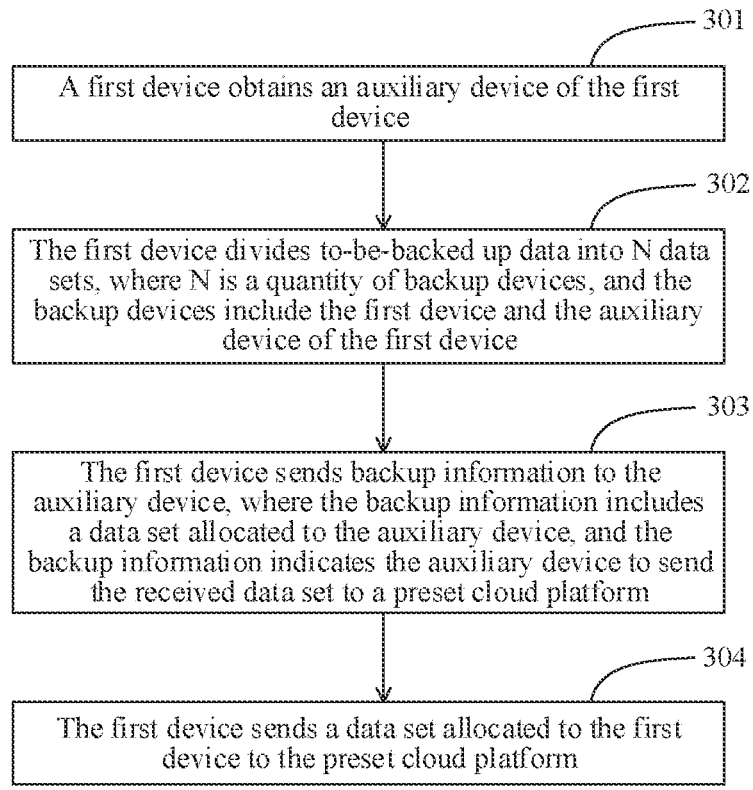
FIG. 3 is a schematic flowchart of a data backup method according to an embodiment of this application.

FIG. 3 is a schematic flowchart of a data backup method according to an embodiment of this application. As shown in the figure, the method includes the following steps.

Step 301: A first device obtains an auxiliary device of the first device.

In this embodiment of this application, the first device first needs to discover a candidate auxiliary device having a capability of communicating with the first device. As shown in the application scenario shown in FIG. 1, some electronic devices discovered by the first device do not have a cloud backup capability, for example, a microwave oven. Alternatively, although the electronic devices have the cloud backup capability, the electronic devices are of little help to a cloud backup task of the first device, for example, a weighting scale or a smart watch. In this case, a candidate auxiliary device that meets a preset condition (where for example, a remaining storage space is sufficient to store an allocated data set, and an average daily uplink bandwidth is greater than a first preset value) is used as an auxiliary device of the first device. For example, a smart screen 1, a smart screen 2, an idle mobile phone 2, and a tablet computer may all be used as auxiliary devices of the first device.

Step 302: The first device divides to-be-backed up data into N data sets, where N is a quantity of backup devices, and the backup devices include the first device and the auxiliary device of the first device.

In this embodiment of this application, both the first device and the auxiliary device of the first device may participate in the cloud backup task. Therefore, the first device and the auxiliary device of the first device may be collectively referred to as the backup devices. The first device may divide, based on the quantity of backup devices, the to-be-backed up data into data sets whose quantity is the same as the quantity of backup devices. Each backup device corresponds to one data set.

In actual application, the to-be-backed up data may be equally divided into a plurality of data sets. Alternatively, the to-be-backed up data may be divided into a plurality of data sets based on an estimated backup periodicity and an estimated backup status of each backup device, to ensure that each backup device can upload a data set allocated to the backup device to a cloud platform in the estimated backup period.

Step 303: The first device sends backup information to the auxiliary device, where the backup information includes a data set allocated to the auxiliary device, and the backup information indicates the auxiliary device to send the received data set to a preset cloud platform.

In this embodiment of this application, the first device may send a data set allocated to each auxiliary device to a corresponding auxiliary device. The first device may select an appropriate communication manner based on a case of each auxiliary device, and send the data set allocated to each auxiliary device to the auxiliary device. For example, for an auxiliary device that is in a same local area network as the first device, the first device may synchronize a corresponding data set to the auxiliary device by selecting a Samba protocol. For an auxiliary device that supports Wi-Fi Direct, the first device may send a corresponding data set to the auxiliary device in a Wi-Fi Direct manner. For an auxiliary device with a Bluetooth module, the first device may send a corresponding data set to the auxiliary device via Bluetooth.

After receiving the allocated data set, each auxiliary device may first store the data set in a local storage space. The auxiliary device uploads the data set in the local storage space to the cloud platform in an idle time. The idle time may be specifically configured. For example, a time in which the auxiliary device is connected to Wi-Fi and is in a screen-off state is used as an idle time. Alternatively, a time in which the auxiliary device is connected to Wi-Fi and an uplink bandwidth is greater than the first preset value may be used as an idle time. Alternatively, a time in which the auxiliary device is connected to Wi-Fi and a load of a processor is less than a first preset proportion may be used as an idle time. Certainly, in actual application, more or fewer conditions may be configured as a condition for determining the idle time of the auxiliary device. This is not limited in this embodiment of this application.

For ease of description, when the auxiliary device is in the idle time may be recorded as when the auxiliary device meets a second preset condition.

Step 304: The first device sends a data set allocated to the first device to the preset cloud platform.

In this embodiment of this application, because the data set is also allocated to the first device in advance, the first device also needs to send the data set allocated to the first device to the cloud platform in an idle time of the first device. For the idle time of the first device, refer to related descriptions of the idle time of the auxiliary device. Details are not described herein again.

In actual application, different conditions may also be set for different electronic devices to determine whether an electronic device is in an idle time.

Both the application scenario shown in FIG. 1 and the embodiment shown in FIG. 3 are used to briefly describe the data backup method provided in embodiments of this application. The following describes specific implementation details of the data backup method provided in embodiments of this application.

In step 301 in FIG. 3, the first device first needs to obtain the candidate auxiliary device having the capability of communicating with the first device.

Figure 4:
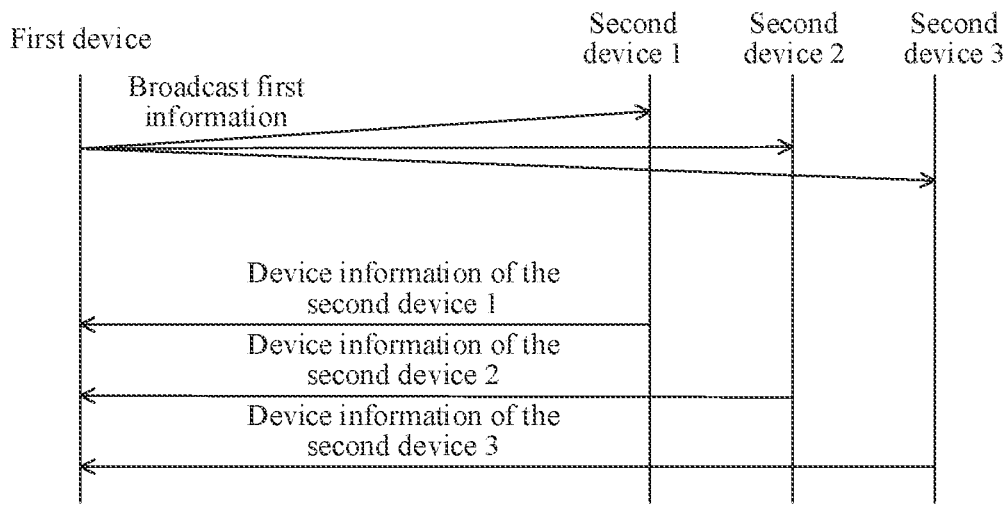
FIG. 4 is a schematic diagram of a time sequence of a method for obtaining a candidate auxiliary device according to an embodiment of this application.

FIG. 4 is a schematic diagram of a time sequence of a method for obtaining the candidate auxiliary device having the capability of communicating with the first device according to an embodiment of this application. The first device broadcasts first information via Bluetooth. After receiving the first information, a second device that can receive the first information may make a feedback based on the first information. For example, after receiving the first information, a second device 1 sends feedback information to the first device, where the feedback information indicates that the second device 1 is within a specific distance range of the first device, and it is convenient to perform subsequent data set transmission between the first device and the second device in a short-distance high-speed transmission manner (for example, 5G Wi-Fi or Wi-Fi Direct). The feedback information may alternatively indicate that the second device 1 can communication with the first device via Bluetooth, and it is convenient to perform subsequent data set transmission between the first device and the second device via Bluetooth. Certainly, the feedback information may alternatively be device information of the second device 1, and the device information of the second device 1 may include: a daily (in actual application, it may alternatively be another unit value for measuring an average value, for example, it may alternatively be every two days or every three days) average charging time, an average load of a central processing unit, an average uplink bandwidth, and a current remaining storage space of the second device 1 in a first historical time period (for example, previous week, previous two weeks, and previous month). In actual application, the device information may be one or more pieces of the foregoing listed information, or may be other information than the foregoing listed information. This is not limited in this embodiment of this application. For another second device that can receive the first information broadcast by the first device, details are not described again in this embodiment of this application.

Whether the feedback information of the second device obtained by the first device is feedback information indicating that the second device is within the specific distance range of the first device and can perform short-distance high-speed transmission with the first device, feedback information indicating that the second device can communicate with the first device via Bluetooth, or the device information of the second device, any second device corresponding to the received feedback information may be used as the candidate auxiliary device of the first device.

Refer to step 301 in FIG. 3. What the first device needs to determine is the auxiliary device of the first device. There-fore, the first device further needs to select the auxiliary device of the first device from the candidate auxiliary devices.

As described above, the second device may feed back the device information of the second device to the first device. In actual application, the second device may feed back other information instead of the device information. For example, the information may be the foregoing feedback information indicating that the second device is within the specific distance range of the first device and can perform short-distance high-speed transmission with the first device, or the feedback information indicating that the second device can communicate with the first device via Bluetooth. In this case, a communication connection may be established between the first device and the second device, and the second device sends the device information of the second device to the first device by using the established communication connection. The first device determines the auxiliary device of the first device based on the device information of the second device.

After obtaining the device information of the second device, the first device may use, with reference to a manner in Table 1, the second device that meets a first preset condition as the auxiliary device of the first device.

TABLE 1

Device parameter table for determining
an auxiliary device of a first device

| Device parameter | First preset condition | Remarks |
| --- | --- | --- |
| Average daily charging time | Greater than first preset time | Prevent standby duration of a device from being greatly reduced due to a corresponding backup subtask |
| Average daily load of a central processing unit | Less than a first preset proportion | Prevent frame freezing on a device due to a corresponding backup subtask |
| Average daily uplink bandwidth | Greater than a first preset value | Upload a stored data set to a cloud platform in a timely manner |
| Current remaining storage space | Greater than a second preset value | Avoid a situation in which a data set corresponding to a backup subtask cannot be stored |

As shown in the remarks in Table 1, a principle of selecting the device parameters is to measure whether the second device can assist the first device in completing the cloud backup task without causing an adverse effect on the second device. In actual application, another device parameter may be selected as the device information based on this principle. The second device whose device parameters meet corresponding conditions may be used as the auxiliary device of the first device. To be specific, the second device whose average daily charging time is greater than the first preset time, whose average daily load of the central processing unit is less than the first preset proportion, whose average daily uplink bandwidth is greater than the first preset value, and whose current remaining storage space is greater than the second preset value is the auxiliary device of the first device.

In actual application, fewer or more device parameters than those in Table 1 may be selected as the device information of the second device.

Refer to step 302 in FIG. 3. After determining the auxiliary device of the first device, the first device needs to divide the to-be-backed up data into a plurality of data sets.

In this embodiment of this application, devices participating in data backup may be collectively referred to as backup devices. In other words, the backup devices include the first device and the auxiliary device of the first device. The first device needs to determine a backup capability of each backup device. In this embodiment of this application, the backup capability of each backup device may be measured based on predicted backup parameters. The predicted backup parameters include a predicted backup speed and predicted backup duration. Assuming that a preset backup periodicity is two days, the predicted backup speed may be a predicted backup speed of the backup device in the backup periodicity corresponding to the backup task. The predicted backup duration is predicted backup duration in which the backup device can perform the backup task in the backup periodicity corresponding to the backup task.

After determining a total data volume of the to-be-backed up data and predicted backup parameters of each backup device, the first device may obtain, through calculation in a manner shown in Table 2, a data volume allocated to each backup device.

TABLE 2

Process table of allocating a data volume to a backup device

| Backup device | Predicted backup duration | Predicted backup speed | Proportion relationship | Allocated data volume |
|---|---|---|---|---|
| First device | 2 hours | 1 Mb/s | 2 | 7 GB |
| Second device 1 | 30 hours | 2 Mb/s | 60 | 210 GB |
| Second device 2 | 3 hours | 1 Mb/s | 3 | 10.5 GB |
| Second device 3 | 1 hour | 1 Mb/s | 1 | 3.5 GB |

As shown in Table 2, a proportion relationship between the predicted backup data volume of each backup device may be obtained based on the predicted backup duration and the predicted backup speed of each backup device, and the relationship is: first device:second device 1:second device 2:second device 3=2:60:3:1. Then, the total data volume of the to-be-backed up data is allocated based on the proportion relationship, to obtain the data volume allocated to each backup device.

After determining the data volume allocated to each backup device, the first device divides, based on the data volume allocated to each backup device, the to-be-backed up data into a data set that matches the data volume of each backup device.

In a specific implementation process, the to-be-backed up data may be divided into four data sets in the following manner: the four data sets are separately allocated to the first device, the second device 1, the second device 2, and the second device 3.

Figure 5:
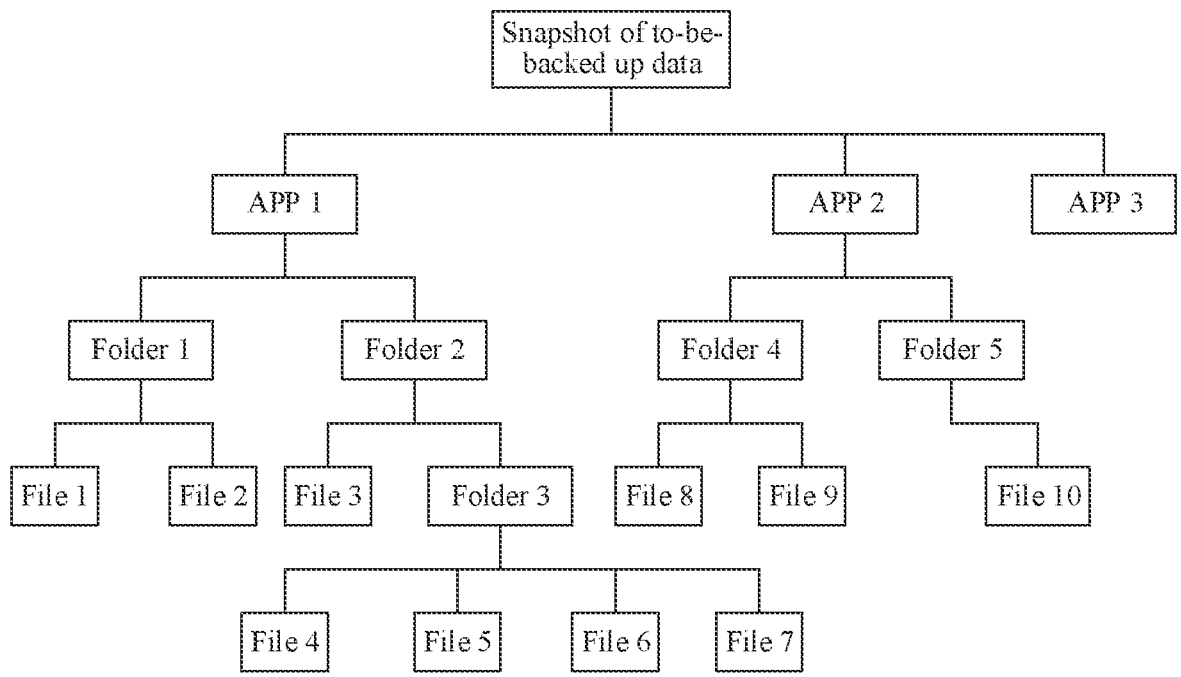
FIG. 5 is a schematic diagram of a method for obtaining a snapshot of to-be-backed up data by scanning according to an embodiment of this application.

Refer to FIG. 5. The first device scans a storage space in which the to-be-backed up data is located, to obtain a tree structure directory of the to-be-backed up data. Tree structure directory information of the to-be-backed up data includes: a root node of the to-be-backed up data, a data volume of the root node, a child node, a data volume of the child node, a leaf node, and a data volume of the leaf node.

In actual application, a root node may be set as a snapshot of the to-be-backed up data. In this case, the data volume of the root node is the total data volume of the to-be-backed up data, and leaf nodes at the end of the tree structure are a file 1, a file 2, a file 3, a file 4, a file 5, a file 6, a file 7, a file 8, a file 9, a file 10, and an APP 3. Folders in the middle are child nodes.

Alternatively, an APP 1, an APP 2, and the APP 3 may be configured as root nodes, and leaf nodes of the APP 1 are the file 1, the file 2, the file 3, the file 4, the file 5, the file 6, and the file 7. Leaf nodes of the APP 2 are the file 8, the file 9, and the file 10. The APP 3 does not have a child node or a leaf node. Alternatively, the APP 3 serves as both a root node and a leaf node.

FIG. 5 does not show the data volume corresponding to the root node, the data volume corresponding to the child node, and the data volume corresponding to the leaf node in the tree structure directory.

Figure 6:
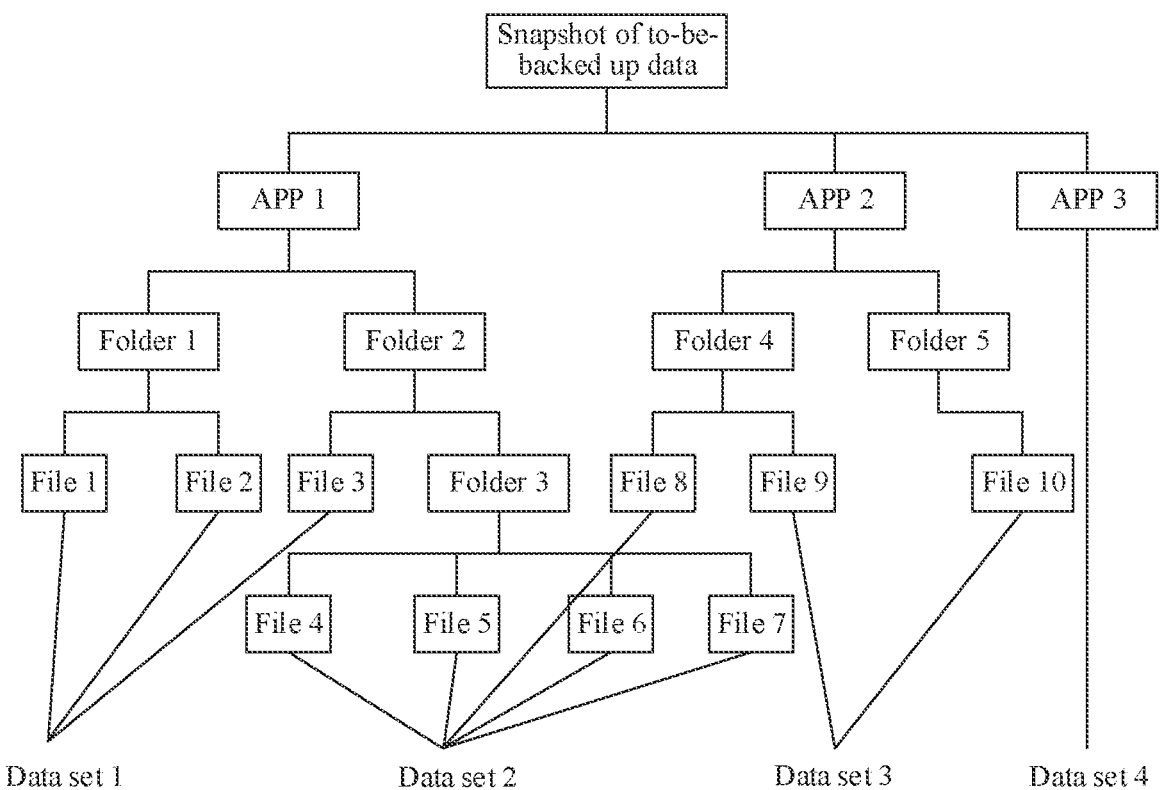
FIG. 6 is a schematic diagram of a method for dividing to-be-backed up data according to an embodiment of this application.

Refer to FIG. 6. The first device may obtain, based on the tree structure directory and the data volume allocated to each backup device, a leaf node allocated to each backup device. After the leaf node is obtained, data represented by the leaf node allocated to each backup device forms a data set allocated to each backup device. Refer to a data set 1, a data set 2, a data set 3, and a data set 4 in FIG. 6. After the leaf node is obtained, a directory in which the leaf node is located may be obtained based on the tree structure directory, to obtain a directory in which data in the data set allocated to each backup device is located.

Refer to step 303 in FIG. 3. When the first device sends, to each auxiliary device, the data set allocated to the auxiliary device, the foregoing Bluetooth communication may be used, or another high-speed transmission manner may be used. This is not limited in this embodiment of this application.

In another embodiment of this application, in a process in which the auxiliary device performs a backup subtask, the first device may alternatively obtain backup progress information of the auxiliary device in a preset time periodicity (for example, every 10 minutes, every 30 minutes, every one hour, and every two hours), where the backup progress information may include a current backup progress (for example, a percentage of data that has been uploaded to a cloud platform) of each auxiliary device, and may further include information indicating whether a backup exception exists. When backup progress information of any auxiliary device includes information indicates that a backup exception exists, the first device reallocates, to the first device and/or an auxiliary device of normal backup, data that fails to be backed up and that is in a data set allocated to the auxiliary device with the backup exception.

It should be noted that the auxiliary device with the backup exception in this embodiment of this application indicates that the auxiliary device may be unable to continue to back up data. For example, the auxiliary device with the backup exception may mean that the auxiliary device is damaged, so that the first device cannot establish a communication connection to the auxiliary device for obtaining backup progress information, or the auxiliary device with the backup exception may mean that the auxiliary device cannot connect to the cloud platform. The auxiliary device with the backup exception may alternatively mean that a data set stored in a storage space is lost.

Certainly, in actual application, when feeding back the backup progress information, the auxiliary device may also feed back, in real time, related information of the data (for example, a name of the data and a directory in which the data is located) that has been successfully backed up. The first device obtains, based on the related information of the data that is successfully backed up and that is fed back by the auxiliary device, data that fails to be backed up by the auxiliary device. When allocating the data that fails to be backed up by the auxiliary device with the backup exception to the first device and/or the auxiliary device of normal backup, the first device may re-use the data that fails to be backed up as the to-be-backed up data and divide the data into N-n data sets (in comparison with the previously divided N data sets, the divided N-n data sets are recorded as secondary data sets) in the manner in Table 2, and n is a quantity of auxiliary devices with a backup exception. It is equivalent to reallocating a secondary data set to each backup device of normal backup (that is, the first device and the auxiliary device of normal backup). Alternatively, the data that fails to be backed up by the auxiliary device with the backup exception is allocated to a device that is of normal backup and whose current backup progress is the fastest.

In addition, in actual application, some steps in the embodiment shown in FIG. 3 may further be performed in another method.

For example, in step 301 in FIG. 3, the first device may discover the candidate auxiliary device having the capability of communicating with the first device in the following manner.

The first device transmits communication information of the first device to a third device by using an NFC module, where the communication information indicates the third device to establish a communication connection to the first device by using the communication information of the first device.

The first device uses the third device that successfully establishes the communication connection to the first device as the candidate auxiliary device of the first device.

Alternatively, the first device obtains communication information of a third device by using an NFC module, and the first device establishes a communication connection to the third device by using the communication information of the third device.

The first device uses the third device that successfully establishes the communication connection to the first device as the candidate auxiliary device of the first device.

In this embodiment of this application, the first device may further determine the candidate auxiliary device of the first device by using the NFC module. The NFC module may have an active mode and a passive mode. When an NFC module of an electronic device is in an active mode, the NFC module of the electronic device may be used as a card reader, to identify related information of another NFC device. When an NFC module of an electronic device is in a passive mode, the NFC module of the electronic device is simulated as a card, and related information is read by another NFC device.

Based on the foregoing description of the NFC module, an NFC module may be disposed on the first device, and an NFC module may also be disposed on the third device. The NFC module of the first device may be simulated as a card to store the communication information of the first device. The NFC module of the third device is equivalent to a card reader. The first device is close to or tightly attached to the third device (or the third device is close to or tightly attached to the first device), and the NFC module of the third device may obtain the communication information of the first device. From the perspective of the first device, the first device transmits the communication information of the first device to the NFC module of the first device by using the NFC module disposed on the first device. The communication information of the first device may be information such as Bluetooth and Wi-Fi of the first device. After receiving the communication information, the third device may establish the communication connection to the first device. The first device may use the third device that successfully establishes the communication connection to the first device as the candidate auxiliary device of the first device.

Certainly, in actual application, when the first device establishes the communication connection to the third device, the NFC module of the third device may also be simulated as a card to store communication information of the third device. The NFC module of the first device is equivalent to a card reader. The first device is close to or tightly attached to the third device (or the third device is close to or tightly attached to the first device), and the NFC module of the first device may obtain the communication information of the third device. The first device establishes the communication connection to the third device by using the communication information of the third device. The first device may use the third device that successfully establishes the communication connection to the first device as the candidate auxiliary device of the first device.

Currently, in actual application, the NFC module of the first device and the NFC module of the third device may alternatively exchange information in another manner, to determine the candidate auxiliary device of the first device. This is not limited in this embodiment of this application.

In another embodiment of this application, in step 301 in FIG. 3, the first device may discover the candidate auxiliary device having the capability of communicating with the first device in the following manner.

Code system information that carries the communication information of the first device is set in the first device, where the code system information indicates a fourth device that scans the code system information to establish a communication connection to the first device by using the communication information of the first device that is obtained through scanning.

The first device uses the fourth device that successfully establishes the communication connection to the first device as the candidate auxiliary device of the first device.

Alternatively, the first device scans code system information including communication information of a fourth device, to obtain the communication information of the fourth device.

The first device establishes a communication connection to the fourth device by using the communication information of the fourth device.

The first device uses the fourth device that successfully establishes the communication connection to the first device as the candidate auxiliary device of the first device.

In this embodiment of this application, an electronic device may include communication information of the electronic device in code system information, for example, a bar code or a two-dimensional code. The code system information may be displayed by the electronic device on a display screen of the electronic device, or the code system information may be pasted on a body of the electronic device. The first device may display the code system information, and the fourth device may scan the code system information of the first device, to obtain the device information of the first device. The fourth device establishes the communication connection to the first device by using the device information obtained through scanning. In actual application, the fourth device may display the code system information. The first device scans the code system information displayed by the fourth device, to obtain the communication information of the fourth device, and the first device establishes the communication connection to the fourth device based on the communication information of the fourth device. Regardless of which manner is used, the fourth device that can successfully establish the communication connection to the first device is the candidate auxiliary device.

It can be understood from the foregoing description that a manner in which the first device determines the candidate auxiliary device of the first device may be selected based on an actual situation. In addition, the third device, the fourth device, and the second device all represent electronic devices in an environment around which the first device is located, but different naming manners are used in different embodiments.

In addition, it should be noted that, after determining the candidate auxiliary device, the first device may obtain device information of the candidate auxiliary device by using an established communication connection, to determine an auxiliary device based on the device information of the candidate auxiliary device. For example, in the manner shown in Table 1, the auxiliary device is determined from the candidate auxiliary devices based on the device information of the candidate auxiliary devices.

After determining the auxiliary device from the candidate auxiliary devices, the first device may maintain the communication connection with the auxiliary device, so that the first device subsequently sends a data set allocated to the auxiliary device to the auxiliary device by using the communication connection. In actual application, after determining the auxiliary device from the candidate auxiliary devices, the first device may alternatively disconnect the communication connection from the auxiliary device. Before the first device sends the data set allocated to the auxiliary device to the auxiliary device, the first device establishes a communication connection to the auxiliary device based on the previously obtained communication information or based on communication information recorded by the previous communication connection.

In addition, it should be noted that in the foregoing example, all auxiliary devices of the first device are near-field devices of the first device. In actual application, the auxiliary devices of the first device may alternatively be far-field devices of the first device. For example, the first device may obtain communication information of the second device by using the cloud platform. The communication information may be an account of the second device. Then, data transmission between the first device and the second device may be implemented based on a technology such as a virtual local area network.

In another embodiment of this application, in step 301 in FIG. 3, the first device may use the candidate auxiliary device that meets the first preset condition as the auxiliary device of the first device in the following manner:

obtaining a score and a weight that correspond to each piece of device information of the candidate auxiliary device, where the device information of the candidate auxiliary device includes one or more of the following: an average charging time, an average load of a central processing unit, an average uplink bandwidth, and a current remaining storage space;

calculating a weighted sum of the device information of the candidate auxiliary based on the score and the weight that correspond to each piece of the device information of the candidate auxiliary device; and using the candidate auxiliary device whose weighted sum of the device information is greater than a third preset value as the auxiliary device of the first device.

In this embodiment of this application, when the device information of the candidate auxiliary device includes the average charging time, the average load of the central processing unit, the average uplink bandwidth, and the current remaining storage space, a value corresponding to the average charging time may be set to different ranges, and each range corresponding to a different score. For example, the average charging time is calculated on a daily basis. When an average charging time is 0 to 1 hour, a score is 10. When an average charging time is 1 to 3 hours, a score is 30. When an average charging time is 3 to 5 hours, a score is 80. When an average charging time is 5 to 24 hours, a score is 100. In actual application, a function relationship between the score and the average charging time may alternatively be set, to obtain the score corresponding to the average charging time based on the function relationship. A manner of obtaining a score of another device parameter in the device information is not described one by one.

The first device may obtain the weighted sum of the device information of the candidate auxiliary device based on a score of each device parameter in the device information of the candidate auxiliary device and a weight that is preset for each device parameter. The weighted sum of the candidate auxiliary devices indicates a capability of the candidate auxiliary device to assist the first device in performing data backup. The first device may determine the auxiliary device from the candidate auxiliary devices based on the weighted sum.

In another embodiment of this application, in step 301 in FIG. 3, the first device may further use the candidate auxiliary device that meets the first preset condition as the auxiliary device of the first device in the following manner:

obtaining a historical backup parameter of the candidate auxiliary device and historical device information corresponding to the historical backup parameter, where the historical backup parameter includes a historical backup speed and historical backup duration, and the historical device information includes one or more of the following: an average charging time, an average load of a central processing unit, an average uplink bandwidth, and a remaining storage space corresponding to the historical backup parameter;

training a preset backup model based on the historical backup parameter and the historical device information corresponding to the historical backup parameter, to obtain a trained backup model;

inputting device information of the candidate auxiliary device into the trained backup model, to obtain predicted backup parameters of the candidate auxiliary device, where the predicted backup parameters include a predicted backup speed and predicted backup duration; and generating a score of the candidate auxiliary device based on the predicted backup parameter, and using the candidate auxiliary device whose score is greater than a fourth preset value as the auxiliary device of the first device.

In this embodiment of this application, because data in the first device is constantly updated, the first device may need to perform cloud backup at an interval (for example, two days, one week, or half a month). Each time cloud backup is performed, the device information of the auxiliary device needs to be obtained: an average charging time, an average load of a central processing unit, an average uplink bandwidth, and a remaining storage space. Therefore, a backup parameter previously used when the auxiliary device assists the first device in performing the cloud backup may be recorded as a historical backup parameter. Actual backup parameters of the auxiliary device during each cloud backup, including a backup speed and backup duration (from a time at which a backup subtask is received to a time at which the backup is completed) may be obtained. An actual backup parameter previously used when the auxiliary device assists the first device in performing the cloud backup may be recorded as a historical backup parameter. In this case, the historical backup parameter of the auxiliary device and the historical device information corresponding to the historical backup parameter may be obtained.

In this embodiment of this application, a suitable auxiliary device may be selected from the candidate auxiliary devices by using a machine learning method. For example, a backup model may be set, and the backup model is trained by using the obtained historical backup parameter and the historical device information corresponding to the historical backup parameter, to obtain a trained backup model. The device information that is of the candidate auxiliary device and that is obtained in this cloud backup process is input into the trained backup model, so that the predicted backup speed and the predicted backup duration of the candidate auxiliary device may be obtained. The score of the candidate auxiliary device is generated based on the predicted backup parameter and the predicted backup duration, and the candidate auxiliary device whose score is greater than the fourth preset value is used as the auxiliary device of the first device. Certainly, the candidate auxiliary device whose predicted backup speed is greater than a preset backup speed and whose predicted backup duration is less than preset backup duration may alternatively be used as the auxiliary device.

In another embodiment of this application, in step 301 in FIG. 3, the first device may obtain the auxiliary device of the first device in the following manner.

The first device broadcasts second information, where the second information carries an identifier of subdata in the to-be-backed up data, the second information indicates a fifth device that receives the second information to select, based on device information of the fifth device and information about the to-be-backed up data, subdata in the to-be-backed up data, and send an identifier of the selected subdata to the first device.

The first device uses the fifth device corresponding to the identifier of the received subdata as the auxiliary device of the first device.

In this embodiment of this application, the first device may divide the to-be-backed up data into a plurality of pieces of subdata, the first device broadcasts a unique identifier and a data volume of each piece of subdata via Bluetooth, and the fifth device that receives the broadcast may select, based on the device information of the fifth device, subdata that the fifth device can assist the first device in processing. For example, the fifth device may determine, based on a remaining storage space, an average daily charging time, a daily average load of a central processing unit, and an average daily uplink bandwidth of the fifth device, a volume of backup data that can be born by the fifth device, and then select corresponding subdata based on the volume of backup data that can be born. The fifth device sends a unique identifier of the selected subdata to the first device.

Correspondingly, in step 302 in FIG. 3, the first device may divide the to-be-backed up data into N data sets in the following manner.

The first device divides, based on an identifier of subdata sent by the auxiliary device and a data volume of the subdata, the to-be-backed up data into the data set that matches each backup device.

In this embodiment of this application, after the first device receives the unique identifier of the subdata sent by the auxiliary device, the first device may learn of a data volume that can be born by each auxiliary device. Certainly, the first device may also select subdata. Different backup devices may select same subdata, and some subdata may not be selected by any backup device. Therefore, the first device needs to reallocate, to each backup device based on an identifier and a data volume of subdata sent by each auxiliary device and an identifier and a data volume of subdata selected by the first device, to-be-backed up subdata of each backup device. The to-be-backed up subdata of each backup device forms a to-be-backed up data set of the backup device.

For example, the to-be-backed up data includes the following subdata: subdata 1 (5 MB), subdata 2 (17 MB), subdata 3 (19 MB), subdata 4 (32 MB), subdata 5 (40 MB), subdata 6 (46 MB), subdata 7 (50 MB), subdata 8 (75 MB), subdata 9 (97 MB), and subdata 10 (102 MB).

A volume of data that can be backed up by an auxiliary device 1 is 500 MB, and a maximum total volume of selected subdata is 500 MB*0.8=400 MB. The subdata 10, the subdata 9, the subdata 8, the subdata 7, and the subdata 6 may be selected.

A volume of data that can be backed up by an auxiliary device 2 is 50 MB, and a maximum total volume of selected subdata is 50 MB*0.8=40 MB. The subdata 5 may be selected.

A volume of data that can be backed up by the first device is 100 MB, and a maximum total volume of selected subdata is 100 MB*0.8=80 MB. The subdata 8 may be selected.

It can be understood from the subdata selected by the foregoing backup devices (the first device and the auxiliary devices), that the backup device first uses a specific proportion (for example, 30%, 50'%, or 80%) of a volume of data that can be backed up by the backup device as a maximum total volume of subdata that can be selected by the backup device. The backup device may select subdata whose data volume is less than the maximum total volume of the subdata that can be backed up by the backup device. During selection, subdata of a largest volume may be first selected from the subdata that can be selected.

The auxiliary device 1 is used as an example. The maximum total volume of subdata that can be selected is 500 MB*0.8=400 MB. If all pieces of subdata are less than 400 MB, the auxiliary device 1 may select the subdata 1 to the subdata 10. The auxiliary device selects from the subdata 10 with the largest volume of data.

When the subdata 10 is selected, a current total data volume is 102 MB.

When the subdata 10 and the subdata 9 are selected, a current total data volume is 102 MB+97 MB=199 MB.

When the subdata 10, the subdata 9, and the subdata 8 are selected, a current data volume is 102 MB+97 MB+75 MB=274 MB.

When the subdata 10, the subdata 9, the subdata 8, and the subdata 7 are selected, a current total data volume is 102 MB+97 MB+75 MB+50 MB=324 MB.

When the subdata 10, the subdata 9, the subdata 8, the subdata 7, and the subdata 6 are selected, a current total data volume is 102 MB+97 MB+75 MB+50 MB+46 MB=370 MB.

When the subdata 10, the subdata 9, the subdata 8, the subdata 7, the subdata 6, and the subdata 5 are selected, a current total data volume is 102 MB+97 MB+75 MB+50 MB+46 MB+40 MB=410 MB. Obviously, the auxiliary device 1 can no longer select the subdata 5. Therefore, the auxiliary device 1 selects the following subdata the subdata 10, the subdata 9, the subdata 8, the subdata 7, and the subdata 6.

Certainly, in actual application, the backup device may alternatively select the subdata in another manner.

The first device reallocates subdata to each backup device based on a unique identifier of selectable subdata reported by each auxiliary device and the subdata selected by the first device.

For example, the subdata 8 has been selected by the auxiliary device 1, so that the subdata 8 may be allocated to the auxiliary device 1, and the subdata 4, the subdata 3, the subdata 2, and the subdata 1 are reallocated to the first device.

It should be noted that subdata is not necessarily one file, and may alternatively include a plurality of files. A plurality of pieces of subdata allocated to each auxiliary device form the data set allocated to each auxiliary device.

It should be understood that writing sequences of the steps do not mean an execution sequence in embodiments. The execution sequence of the processes needs to be determined based on functions and internal logic of the processes, and should not constitute any limitation on the implementation processes of embodiments of this application.

In embodiments of this application, the first device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used. An example in which each functional module is obtained through division based on each corresponding function is used below for description.

Figure 7:
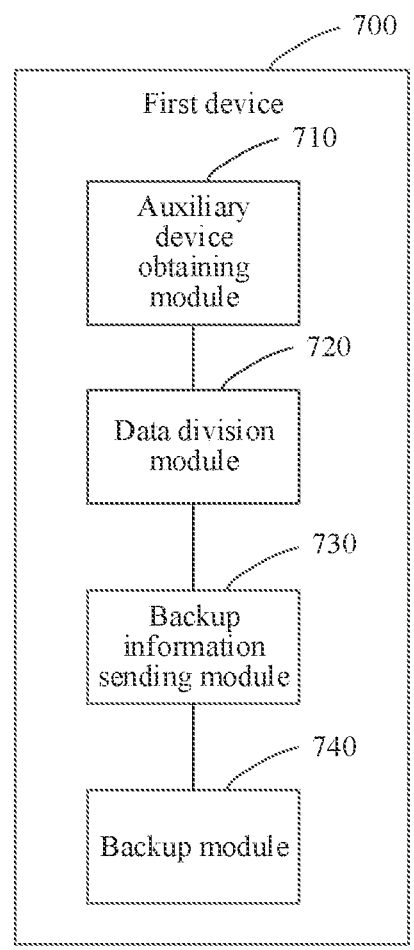
FIG. 7 is a schematic block diagram of functional architectural modules of a first device according to an embodiment of this application.

Refer to FIG. 7. A first device 700 includes:
an auxiliary device obtaining module 710, configured to obtain an auxiliary device of the first device;
a data division module 720, configured to divide to-be-backed up data into N data sets, where N is a quantity of backup devices, and the backup devices include the first device and the auxiliary device of the first device;
a backup information sending module 730, configured to send backup information to the auxiliary device, where the backup information includes a data set allocated to the auxiliary device, and the backup information indicates the auxiliary device to send the received data set to a preset cloud platform; and
a backup module 740, configured to send a data set allocated to the first device to the preset cloud platform.

In another embodiment of this application, the auxiliary device obtaining module 710 is further configured to:
obtain a candidate auxiliary device having a capability of communicating with the first device; and
use the candidate auxiliary device that meets a first preset condition as the auxiliary device of the first device.

In another embodiment of this application, the auxiliary device obtaining module 710 is further configured to:
broadcast first information via Bluetooth, where the first information indicates a second device that receives the first information to feed back device information of a second device; and
use the second device indicated by the received device information as the candidate auxiliary device of the first device.

In another embodiment of this application, the auxiliary device obtaining module 710 is further configured to:
transmit communication information of the first device to a third device by using an NFC module, where the communication information indicates the third device to establish a communication connection to the first device by using the communication information of the first device; and
use the third device that successfully establishes the communication connection to the first device as the candidate auxiliary device of the first device; or
obtain communication information of a third device by using an NFC module, and establish a communication connection to the third device by using the communication information of the third device; and
use the third device that successfully establishes the communication connection to the first device as the candidate auxiliary device of the first device.

In another embodiment of this application, the auxiliary device obtaining module 710 is further configured to:
set, in the first device, code system information that carries the communication information of the first device, where the code system information indicates a fourth device that scans the code system information to establish a communication connection to the first device by using the communication information of the first device that is obtained through scanning; and
use the fourth device that successfully establishes the communication connection to the first device as the candidate auxiliary device of the first device; or
scan code system information including communication information of a fourth device, to obtain the communication information of the fourth device;
establish a communication connection to the fourth device by using the communication information of the fourth device; and
use the fourth device that successfully establishes the communication connection to the first device as the candidate auxiliary device of the first device.

In another embodiment of this application, the auxiliary device obtaining module 710 is further configured to:
use the candidate auxiliary device whose average charging time is greater than a first preset time, whose average load of a central processing unit is less than a first preset proportion, whose average uplink bandwidth is greater than a first preset value, and whose current remaining storage space is greater than a second preset value as the auxiliary device of the first device.

In another embodiment of this application, the auxiliary device obtaining module 710 is further configured to:
obtain a score and a weight that correspond to each piece of device information of the candidate auxiliary device, where the device information of the candidate auxiliary device includes one or more of the following: an average charging time, an average load of a central processing unit, an average uplink bandwidth, and a current remaining storage space;
calculate a weighted sum of the device information of the first device based on the score and the weight that correspond to each piece of the device information of the candidate auxiliary device; and
use the candidate auxiliary device whose weighted sum of the device information is greater than a third preset value as the auxiliary device of the first device.

In another embodiment of this application, the auxiliary device obtaining module 710 is further configured to:
- obtain a historical backup parameter of the candidate auxiliary device and historical device information corresponding to the historical backup parameter, where the historical backup parameter includes a historical backup speed and historical backup duration, and the historical device information includes one or more of the following: an average charging time, an average load of a central processing unit, an average uplink bandwidth, and a remaining storage space corresponding to the historical backup parameter;
- train a preset backup model based on the historical backup parameter and the historical device information corresponding to the historical backup parameter, to obtain a trained backup model;
- inputting device information of the candidate auxiliary device into the trained backup model, to obtain predicted backup parameters of the candidate auxiliary device, where the predicted backup parameters include a predicted backup speed and predicted backup duration; and
- generate a score of the candidate auxiliary device based on the predicted backup parameter, and use the candidate auxiliary device whose score is greater than a fourth preset value as the auxiliary device of the first device.

In another embodiment of this application, the data division module 720 is further configured to:
- obtain predicted backup parameters of the backup devices, where the predicted backup parameters include a predicted backup speed and predicted backup duration;
- obtain, based on the predicted backup parameters of the backup devices and a total data volume of the to-be-backed up data, a data volume allocated to each backup device; and
- divide, based on the data volume allocated to each backup device, the to-be-backed up data into a data set that matches the data volume of each backup device.

In another embodiment of this application, the data division module 720 is further configured to:
- scan a storage space in which the to-be-backed up data is located, to obtain a tree structure directory of the to-be-backed up data, where tree structure directory information of the to-be-backed up data includes: a root node of the to-be-backed up data, a data volume of the root node, a child node, a data volume of the child node, a leaf node, and a data volume of the leaf node; and
- obtain a leaf node allocated to each backup device based on the tree structure directory of the to-be-backed up data and the data volume allocated to each backup device, where a set formed by data represented by the leaf node allocated to each backup device is the data set of each backup device.

In another embodiment of this application, the electronic device 700 further includes:
- a progress monitoring module, configured to obtain backup progress information of an auxiliary device in a preset time periodicity; and
- when a backup exception exists in the backup progress information of the auxiliary device, reallocate, to a first device and/or an auxiliary device of normal backup, data that fails to be backed up and that is in a data set allocated to the auxiliary device with the backup exception.

In another embodiment of this application, the auxiliary device obtaining module 710 is further configured to:
- broadcast second information, where the second information carries an identifier of subdata in the to-be-backed up data, the second information indicates a fifth device that receives the second information to select, based on device information of the fifth device and information about the to-be-backed up data, the subdata in the to-be-backed up data, and send the identifier of the selected subdata to the first device; and
- use the fifth device corresponding to the identifier of the received subdata as the auxiliary device of the first device.

In another embodiment of this application, the data division module 720 is further configured to:
- divide, based on an identifier of subdata sent by the auxiliary device and a data volume of the subdata, the to-be-backed up data into a data set that matches each backup device.

It should be noted that content such as information exchange between the foregoing first devices/modules and the execution process thereof is based on a same concept as the method embodiments of this application. For details about specific functions and technical effects of the content, refer to the method embodiments. The details are not described herein again.

In addition, the first device and the auxiliary device of the first device provided in embodiments of this application may form a data backup system.

The first device performs any one of the foregoing data backup methods.

The auxiliary device is configured to: after receiving a data set allocated to the auxiliary device, store the data set in a storage space of the auxiliary device, and when the auxiliary device meets a second preset condition, send the data set stored in the storage space of the auxiliary device to a preset cloud platform.

It may be clearly understood by a person skilled in the art that, for the purpose of convenient and brief description, division of the foregoing functional modules is used as an example for illustration. In actual application, the foregoing functions can be allocated to different functional modules and implemented according to a requirement, that is, an inner structure of an electronic device is divided into different functional modules to implement all or some of the functions described above. Functional modules in embodiments may be integrated into one processing module, or each of the modules may exist alone physically, or two or more modules may be integrated into one module. The integrated module may be implemented in a form of hardware, or may be implemented in a form of a software functional module. In addition, specific names of the functional modules are merely for ease of distinguishing between the functional modules, but are not intended to limit the protection scope of this application. For a specific working process of the modules in the first device, refer to a corresponding process in the foregoing method embodiments. Details are not described herein again.

An embodiment of this application further provides a computer-readable storage medium. The computer-readable storage medium stores a computer program. When the computer program is executed by a processor, the steps in the foregoing method embodiments can be implemented.

An embodiment of this application further provides a computer program product. When the computer program product runs on a first device, the first device is enabled to perform the steps in the foregoing method embodiments.

When the integrated module is implemented in the form of a software functional module and sold or used as an independent product, the integrated unit may be stored in a computer-readable storage medium. Based on such an understanding, all or some of the procedures of the method in embodiments of this application may be implemented by a computer program instructing related hardware. The computer program may be stored in a computer-readable storage medium. When the computer program is executed by a processor, the steps in the foregoing method embodiments can be implemented. The computer program includes computer program code. The computer program code may be in a source code form, an object code form, an executable file form, some intermediate forms, or the like. The computer-readable medium may include at least any entity or apparatus that can carry the computer program code to a first device, a recording medium, a computer memory, a read-only memory (ROM. Read-Only Memory), a random access memory (RAM, Random Access Memory), an electrical carrier signal, a telecommunication signal, and a software distribution medium, for example, a USB flash drive, a removable hard disk, a magnetic disk, or an optical disk. In some jurisdictions, the computer-readable medium cannot be the electrical carrier signal or the telecommunication signal according to legislation and patent practices.

An embodiment of this application further provides a chip system. The chip system includes a processor, the processor is coupled to a memory, and the processor executes a computer program stored in the memory, to implement the steps in any method embodiment of this application. The chip system may be a single chip or a chip module including a plurality of chips.

In the foregoing embodiments, descriptions of embodiments have respective focuses. For a part that is not described in detail or recorded in an embodiment, refer to related descriptions in other embodiments.

A person of ordinary skill in the art may be aware that, in combination with the examples described in embodiments disclosed in this specification, units and steps of methods may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

The foregoing embodiments are merely intended to describe the technical solutions of this application, but are not to limit this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

What is claimed is:

1. A data backup method, comprising:
   obtaining, by a first device, an auxiliary device of the first device;
   dividing, by the first device, to-be-backed up data into N data sets, wherein N is a quantity of backup devices, and the backup devices comprise the first device and the auxiliary device of the first device, wherein the dividing, by the first device, to-be-backed up data into N data sets comprises:
   obtaining, by the first device, predicted backup parameters of the backup devices, wherein the predicted backup parameters comprise a predicted backup speed and predicted backup duration;
   obtaining, by the first device based on the predicted backup speed and the predicted backup duration of each one of the backup devices, a proportion relationship corresponding to a predicted backup data volume of each one of the backup devices, wherein the proportion relationship comprises a value that indicates a proportion of a total data volume of the to-be-backed up data that will be allocated to a respective backup device;
   determining, by the first device based on the proportion relationship and the total data volume of the to-be-backed up data, a data volume allocated to each backup device; and
   dividing, by the first device based on the data volume allocated to each backup device, the to-be-backed up data into the N data sets, wherein each data set of the N data sets matches the data volume of a respective backup device;
   sending, by the first device, backup information to the auxiliary device, wherein the backup information comprises a data set allocated to the auxiliary device, and the backup information indicates the auxiliary device to send the received data set to a preset cloud platform; and
   sending, by the first device, a data set allocated to the first device to the preset cloud platform.

2. The method according to claim 1, wherein the obtaining, by a first device, an auxiliary device of the first device comprises:
   obtaining, by the first device, a candidate auxiliary device having a capability of communicating with the first device; and
   using, by the first device, the candidate auxiliary device that meets a first preset condition as the auxiliary device of the first device.

3. The method according to claim 2, wherein the obtaining, by the first device, a candidate auxiliary device having a capability of communicating with the first device comprises:
   broadcasting, by the first device, first information via Bluetooth, wherein the first information indicates a second device that receives the first information to feed back device information of the second device; and
   using, by the first device, the second device indicated by the received device information as the candidate auxiliary device of the first device.

4. The method according to claim 2, wherein the obtaining, by the first device, a candidate auxiliary device having a capability of communicating with the first device comprises:
   transmitting, by the first device, communication information of the first device to a third device by using an NFC module, wherein the communication information indicates the third device to establish a communication connection to the first device by using the communication information of the first device; and
   using, by the first device, the third device that successfully establishes the communication connection to the first device as the candidate auxiliary device of the first device; or obtaining, by the first device, communication information of a third device by using an NFC module, and establishing, by the first device, a communication connection to the third device by using the communication information of the third device; and using, by the first device, the third device that successfully establishes the communication connection to the first device as the candidate auxiliary device of the first device.

5. The method according to claim 2, wherein the obtaining, by the first device, a candidate auxiliary device having a capability of communicating with the first device comprises:

setting, in the first device, code system information that carries communication information of the first device, wherein the code system information indicates a fourth device that scans the code system information to establish a communication connection to the first device by using the communication information of the first device that is obtained through scanning; and using, by the first device, the fourth device that successfully establishes the communication connection to the first device as the candidate auxiliary device of the first device; or scanning, by the first device, code system information comprising communication information of a fourth device, to obtain the communication information of the fourth device;

establishing, by the first device, a communication connection to the fourth device by using the communication information of the fourth device; and using, by the first device, the fourth device that successfully establishes the communication connection to the first device as the candidate auxiliary device of the first device.

6. The method according to claim 2, wherein the using, by the first device, the candidate auxiliary device that meets a first preset condition as the auxiliary device of the first device comprises:

using, by the first device, the candidate auxiliary device whose average charging time is greater than a first preset time, whose average load of a central processing unit is less than a first preset proportion, whose average uplink bandwidth is greater than a first preset value, and whose current remaining storage space is greater than a second preset value as the auxiliary device of the first device.

7. The method according to claim 2, wherein the using, by the first device, the candidate auxiliary device that meets a first preset condition as the auxiliary device of the first device comprises:

obtaining, by the first device, a score and a weight that correspond to each piece of device information of the candidate auxiliary device, wherein the device information of the candidate auxiliary device comprises one or more of the following: an average charging time, an average load of a central processing unit, an average uplink bandwidth, and a current remaining storage space;

calculating, by the first device, a weighted sum of the device information of the first device based on the score and the weight that correspond to each piece of the device information of the candidate auxiliary device; and using, by the first device, the candidate auxiliary device whose weighted sum of the device information is greater than a third preset value as the auxiliary device of the first device.

8. The method according to claim 2, wherein the using, by the first device, the candidate auxiliary device that meets a first preset condition as the auxiliary device of the first device comprises:

obtaining, by the first device, a historical backup parameter of the candidate auxiliary device and historical device information corresponding to the historical backup parameter, wherein the historical backup parameter comprises a historical backup speed and historical backup duration, and the historical device information comprises one or more of the following: an average charging time, an average load of a central processing unit, an average uplink bandwidth, and a remaining storage space that correspond to the historical backup parameter; and training, by the first device, a preset backup model based on the historical backup parameter and the historical device information corresponding to the historical backup parameter, to obtain a trained backup model;

inputting, by the first device, device information of the candidate auxiliary device into the trained backup model, to obtain predicted backup parameters of the candidate auxiliary device, wherein the predicted backup parameters comprise a predicted backup speed and predicted backup duration; and generating, by the first device, a score of the candidate auxiliary device based on the predicted backup parameters, and using the candidate auxiliary device whose score is greater than a fourth preset value as the auxiliary device of the first device.

9. The method according to claim 1, wherein the dividing, by the first device based on the data volume allocated to each backup device, the to-be-backed up data into a data set that matches the data volume of each backup device comprises:

scanning, by the first device, a storage space in which the to-be-backed up data is located, to obtain a tree structure directory of the to-be-backed up data, wherein tree structure directory information of the to-be-backed up data comprises: a root node of the to-be-backed up data, a data volume of the root node, a child node, a data volume of the child node, a leaf node, and a data volume of the leaf node; and obtaining a leaf node allocated to each backup device based on the tree structure directory of the to-be-backed up data and the data volume allocated to each backup device, wherein a set formed by data represented by the leaf node allocated to each backup device is the data set of each backup device.

10. The method according to claim 1, wherein the method further comprises:

obtaining, by the first device, backup progress information of the auxiliary device in a preset time periodicity; and when a backup exception exists in the backup progress information of the auxiliary device, reallocating, by the first device, to the first device and/or an auxiliary device of normal backup, data that fails to be backed up and that is in the data set allocated to the auxiliary device with the backup exception.

11. The method according to claim 1, wherein the obtaining, by a first device, an auxiliary device of the first device comprises:

broadcasting, by the first device, second information, wherein the second information carries an identifier of subdata in the to-be-backed up data, the second information indicates a fifth device that receives the second information to select, based on device information of the fifth device and information about the to-be-backed up data, subdata in the to-be-backed up data, and send an identifier of the selected subdata to the first device; and using, by the first device, the fifth device corresponding to the identifier of the received subdata as the auxiliary device of the first device.

12. The method according to claim 11, wherein the dividing, by the first device, to-be-backed up data into N data sets comprises:

dividing, by the first device based on an identifier of subdata sent by the auxiliary device and a data volume of the subdata, the to-be-backed up data into the data set that matches each backup device.

13. An electronic device, wherein the electronic device is a first device comprising a processor, and the processor is configured to run a computer program stored in a memory, to implement the following steps:

obtaining, by the first device, an auxiliary device of the first device;

dividing, by the first device, to-be-backed up data into N data sets, wherein N is a quantity of backup devices, and the backup devices comprise the first device and the auxiliary device of the first device, wherein the dividing, by the first device, to-be-backed up data into N data sets comprises:

obtaining, by the first device, predicted backup parameters of the backup devices, wherein the predicted backup parameters comprise a predicted backup speed and predicted backup duration;

obtaining, by the first device based on the predicted backup speed and the predicted backup duration of each one of the backup devices, a proportion relationship corresponding to a predicted backup data volume of each one of the backup devices, wherein the proportion relationship comprises a value that indicates a proportion of a total data volume of the to-be-backed up data that will be allocated to a respective backup device;

determining, by the first device based on the proportion relationship and a total data volume of the to-be-backed up data, a data volume allocated to each backup device; and dividing, by the first device based on the data volume allocated to each backup device, the to-be-backed up data into N data sets, wherein each data set of the N data sets matches the data volume of a respective backup device;

sending, by the first device, backup information to the auxiliary device, wherein the backup information comprises a data set allocated to the auxiliary device, and the backup information indicates the auxiliary device to send the received data set to a preset cloud platform; and sending, by the first device, a data set allocated to the first device to the preset cloud platform.

14. The electronic device according to claim 13, wherein the obtaining, by a first device, an auxiliary device of the first device comprises:

obtaining, by the first device, a candidate auxiliary device having a capability of communicating with the first device; and using, by the first device, the candidate auxiliary device that meets a first preset condition as the auxiliary device of the first device.

15. The electronic device according to claim 14, wherein the obtaining, by the first device, a candidate auxiliary device having a capability of communicating with the first device comprises:

broadcasting, by the first device, first information via Bluetooth, wherein the first information indicates a second device that receives the first information to feed back device information of the second device; and using, by the first device, the second device indicated by the received device information as the candidate auxiliary device of the first device.

16. The electronic device according to claim 14, wherein the obtaining, by the first device, a candidate auxiliary device having a capability of communicating with the first device comprises:

transmitting, by the first device, communication information of the first device to a third device by using an NFC module, wherein the communication information indicates the third device to establish a communication connection to the first device by using the communication information of the first device; and using, by the first device, the third device that successfully establishes the communication connection to the first device as the candidate auxiliary device of the first device; or obtaining, by the first device, communication information of a third device by using an NFC module, and establishing, by the first device, a communication connection to the third device by using the communication information of the third device; and using, by the first device, the third device that successfully establishes the communication connection to the first device as the candidate auxiliary device of the first device.

17. The electronic device according to claim 14, wherein the obtaining, by the first device, a candidate auxiliary device having a capability of communicating with the first device comprises:

setting, in the first device, code system information that carries communication information of the first device, wherein the code system information indicates a fourth device that scans the code system information to establish a communication connection to the first device by using the communication information of the first device that is obtained through scanning; and using, by the first device, the fourth device that successfully establishes the communication connection to the first device as the candidate auxiliary device of the first device; or scanning, by the first device, code system information comprising communication information of a fourth device, to obtain the communication information of the fourth device;

establishing, by the first device, a communication connection to the fourth device by using the communication information of the fourth device; and using, by the first device, the fourth device that successfully establishes the communication connection to the first device as the candidate auxiliary device of the first device.

18. The electronic device according to claim 14, wherein the using, by the first device, the candidate auxiliary device that meets a first preset condition as the auxiliary device of the first device comprises:

using, by the first device, the candidate auxiliary device whose average charging time is greater than a first preset time, whose average load of a central processing unit is less than a first preset proportion, whose average uplink bandwidth is greater than a first preset value, and whose current remaining storage space is greater than a second preset value as the auxiliary device of the first device.

19. The electronic device according to claim 14, wherein the using, by the first device, the candidate auxiliary device that meets a first preset condition as the auxiliary device of the first device comprises:
- obtaining, by the first device, a score and a weight that correspond to each piece of device information of the candidate auxiliary device, wherein the device information of the candidate auxiliary device comprises one or more of the following: an average charging time, an average load of a central processing unit, an average uplink bandwidth, and a current remaining storage space;
- calculating, by the first device, a weighted sum of the device information of the first device based on the score and the weight that correspond to each piece of the device information of the candidate auxiliary device; and
- using, by the first device, the candidate auxiliary device whose weighted sum of the device information is greater than a third preset value as the auxiliary device of the first device.

20. The electronic device according to claim 14, wherein the using, by the first device, the candidate auxiliary device that meets a first preset condition as the auxiliary device of the first device comprises:
- obtaining, by the first device, a historical backup parameter of the candidate auxiliary device and historical device information corresponding to the historical backup parameter, wherein the historical backup parameter comprises a historical backup speed and historical backup duration, and the historical device information comprises one or more of the following: an average charging time, an average load of a central processing unit, an average uplink bandwidth, and a remaining storage space that correspond to the historical backup parameter; and
- training, by the first device, a preset backup model based on the historical backup parameter and the historical device information corresponding to the historical backup parameter, to obtain a trained backup model;
- inputting, by the first device, device information of the candidate auxiliary device into the trained backup model, to obtain predicted backup parameters of the candidate auxiliary device, wherein the predicted backup parameters comprise a predicted backup speed and predicted backup duration; and
- generating, by the first device, a score of the candidate auxiliary device based on the predicted backup parameters, and using the candidate auxiliary device whose score is greater than a fourth preset value as the auxiliary device of the first device.

\* \* \* \* \*